United States Patent
Finkelshtein et al.

(10) Patent No.: US 11,303,672 B2
(45) Date of Patent: Apr. 12, 2022

(54) DETECTING REPLAY ATTACKS USING ACTION WINDOWS

(71) Applicant: International Business Machines Corporation, Armonk, NY (US)

(72) Inventors: Andrey Finkelshtein, Beer Sheva (IL); Itay Hazan, Beer Sheva (IL)

(73) Assignee: International Business Machines Corporation, Armonk, NY (US)

(*) Notice: Subject to any disclaimer, the term of this patent is extended or adjusted under 35 U.S.C. 154(b) by 99 days.

(21) Appl. No.: 16/838,639

(22) Filed: Apr. 2, 2020

(65) Prior Publication Data
US 2021/0314350 A1    Oct. 7, 2021

(51) Int. Cl.
H04L 29/06 (2006.01)
H04L 67/14 (2022.01)

(52) U.S. Cl.
CPC ...... *H04L 63/1466* (2013.01); *H04L 63/0428* (2013.01); *H04L 63/0838* (2013.01); *H04L 63/0861* (2013.01); *H04L 67/14* (2013.01)

(58) Field of Classification Search
CPC .. H04L 63/1466; H04L 63/0861; H04L 67/14
See application file for complete search history.

(56) References Cited

U.S. PATENT DOCUMENTS

| | | | |
|---|---|---|---|
| 8,555,062 B1 | 10/2013 | Abdulrahiman et al. | |
| 8,925,058 B1 | 12/2014 | Dotan et al. | |
| 8,990,935 B1* | 3/2015 | Cutts | G06F 21/554 726/22 |
| 9,870,455 B2 | 1/2018 | Song et al. | |
| 10,817,793 B1* | 10/2020 | Duckworth | G06F 16/9535 |
| 2003/0065919 A1* | 4/2003 | Albert | G06F 21/31 713/168 |
| 2010/0281539 A1* | 11/2010 | Burns | H04L 63/1441 726/23 |
| 2017/0235623 A1* | 8/2017 | Brew | H04L 41/064 714/37 |
| 2017/0346751 A1* | 11/2017 | Barnes | H04L 47/283 |
| 2018/0012003 A1 | 1/2018 | Asulin et al. | |

(Continued)

OTHER PUBLICATIONS

Pusara, Maja et al., "User Re-Authentication via Mouse Movements," Proceedings of the 2004 ACM workshop on Visualization and data mining for computer security, 2004, 8 pages.

(Continued)

*Primary Examiner* — Vance M Little
(74) *Attorney, Agent, or Firm* — Barry D. Blount

(57) ABSTRACT

An example system includes a processor to receive a current session and previous sessions associated with an account. The processor can split the current session and the previous sessions into action windows. The processor can calculate a window similarity score for each action window of the current session using a pair-wise comparison with action windows of each of the previous sessions. The processor can aggregate the window similarity scores to generate a replay likelihood score for the current session with respect to each of the previous sessions. The processor can classify the current session as a replay attack in response to detecting that a replay likelihood score of the current session exceeds a threshold.

17 Claims, 7 Drawing Sheets

(56) References Cited

U.S. PATENT DOCUMENTS

| | | |
|---|---|---|
| 2018/0034850 A1 | 2/2018 | Turgeman |
| 2018/0336353 A1* | 11/2018 | Manadhata ......... G06F 16/9024 |
| 2019/0057388 A1 | 2/2019 | Kolotinsky |
| 2019/0220863 A1* | 7/2019 | Novick ............... H04W 12/122 |
| 2020/0327020 A1* | 10/2020 | Liu ....................... G06F 3/0653 |

OTHER PUBLICATIONS

Ahmed, Ahmed Awad E., "A New Biometric Technology Based on Mouse Dynamics," IEEE Transactions on Dependable and Secure Computing, vol. 4, No. 3, Jul. 2007; https://doi.org/10.1109/TDSC.2007.70207, 15 pages.

Feher, Clint et al., "User Identity Verification via Mouse Dynamics," Information Sciences 201, 2012, 34 pages.

Shen, Chao et al., "User Authentication Through Mouse Dynamics," IEEE Transactions on Information Forensics and Security, vol. 8, No. 1, Jan. 2013, pp. 16-30.

\* cited by examiner

DETECTING REPLAY ATTACKS USING ACTION WINDOWS

BACKGROUND

The present techniques relate to detecting replay attacks. More specifically, the techniques relate to detecting replay attacks on online services.

SUMMARY

According to an embodiment described herein, a system can include processor to receive a current session and previous sessions associated with an account. The processor can also further split the current session and the previous sessions into action windows. The processor can also calculate a window similarity score for each action window of the current session using a pair-wise comparison with action windows of each of the previous sessions. The processor can aggregate the window similarity scores to generate a replay likelihood score for the current session with respect to each of the previous sessions. The processor can also classify the current session as a replay attack in response to detecting that a replay likelihood score of the current session exceeds a threshold.

According to another embodiment described herein, a method can include receiving, via a processor, a current session and previous sessions associated with an account. The method can further include splitting, via the processor, the current session and the previous sessions into action windows. The method can also further include calculating, via the processor, a window similarity score for each action window of the current session using a pair-wise comparison with action windows of each of the previous sessions. The method can also include aggregating, via the processor, the window similarity scores to generate a replay likelihood score for the current session with respect to each of the previous sessions. The method can also further include classifying, via the processor, the current session as a replay attack in response to detecting that a replay likelihood score of the current session exceeds a threshold.

According to another embodiment described herein, a computer program product for detecting replay attacks using session scores can include computer-readable storage medium having program code embodied therewith. The computer readable storage medium is not a transitory signal per se. The program code executable by a processor to cause the processor to receive a current session and previous sessions associated with an account. The program code can also cause the processor to split the current session and the previous sessions into action windows. The program code can also cause the processor to calculate a window similarity score for each action window of the current session using a pair-wise comparison with action windows of each of the previous sessions. The program code can also cause the processor to aggregate the window similarity scores to generate a replay likelihood score for the current session with respect to each of the previous sessions. The program code can also cause the processor to classify the current session as a replay attack in response to detecting that a replay likelihood score of the current session exceeds a threshold.

DETAILED DESCRIPTION

Figure 1:
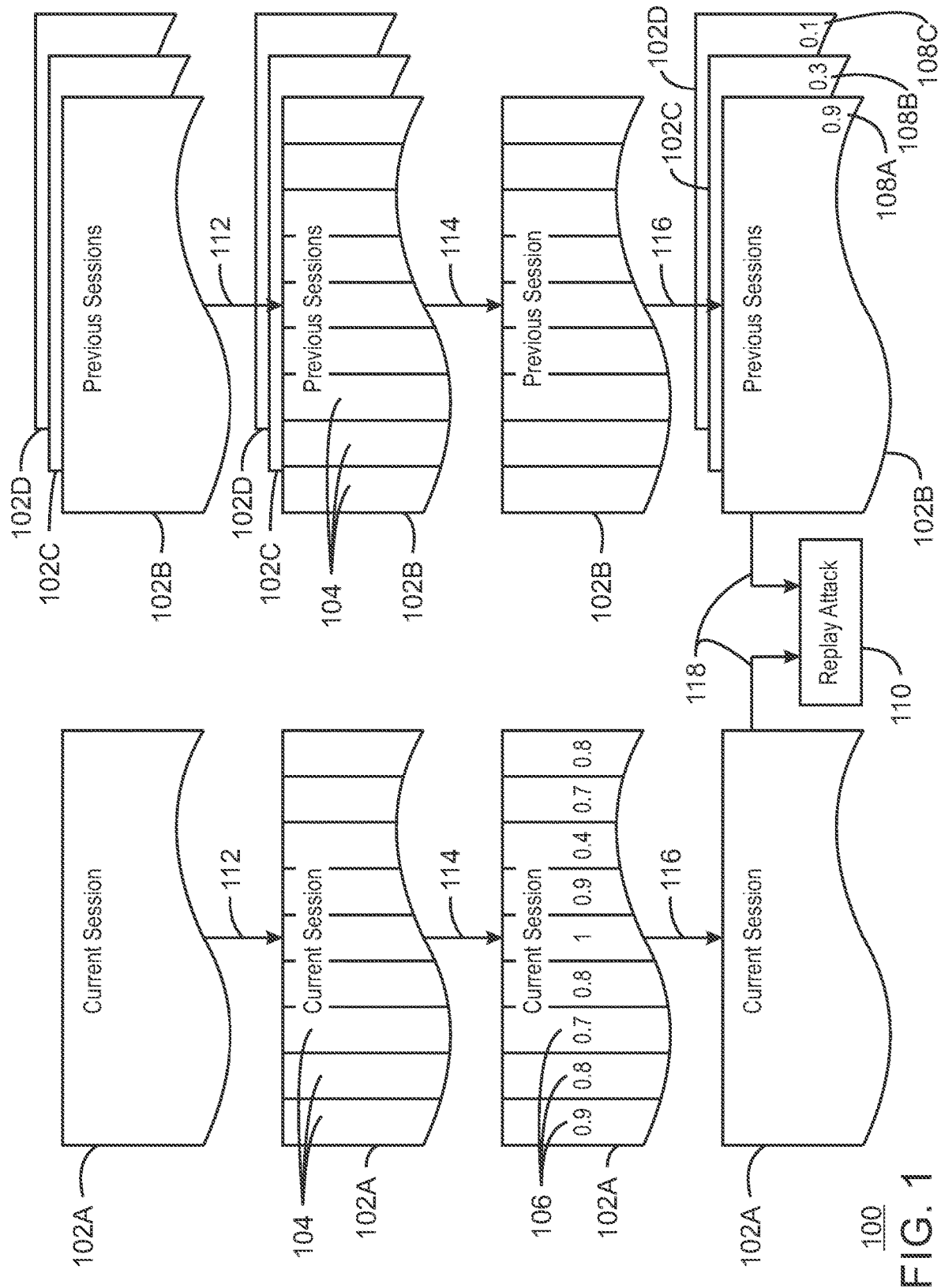
FIG. 1 is a schematic diagram of an example process for detecting replay attacks using action windows.

Behavioral biometrics (BB) may be used to detect unauthorized online behavior. For example, BB technology focuses on verifying identities of users by creating a profile model of each user's behavior patterns within a service. For example, these BB profile models may be based on behavioral patterns from input devices such as a mouse, a keyboard, a touch screen, etc. BB technology may be based on statistical learning, machine learning, or deep learning methods that learn the user identity based on previous sessions. Such methods may then seek for similarities between current sessions and previous sessions. However, experience shows that user behavior slightly changes between sessions. Thus, the likelihood of identical or nearly identical sessions is very low and such cases are more likely to be the result of a replayed or a slightly modified spoofed session. Nevertheless, very similar or identical sessions may be detected as legitimate for such BB models.

Online accounts may thus be vulnerable to attacks where an impostor may be able to spoof the BB profile of a user. For example, such attacks may include spoofing the victim's sessions of mouse movements, keyboard strokes or touch screen events using a malware, a malicious network or a spoofed website. In some cases, an attacker can perform a replay attack where collected session events in the same manner as the session events were collected, or with some minor changes, as input to the service. For example, the session events may be keyboard strokes that may be slightly modified to change the rhythm of the strokes. Since an impostor may be able to steal or spoof the username and password of the user using similar techniques, such attacks may also be used to grant the impostor the access to the victim's account allowing the impostor to lure the BB verification. For example, an impostor may use malware or email to steal or spoof a username and password and then login to the user's account using spoofed session events to trick the BB verification into allowing access to the user's account.

According to embodiments of the present disclosure, a system includes a processor that can receive a current session and previous sessions associated with an account. The processor can also split the current session and the previous sessions into action windows. The processor can further calculate a window similarity score for each action window of the current session using a pair-wise comparison with action windows of each of the previous sessions. The processor can aggregate the window similarity scores to generate a replay likelihood score for the current session with respect to each of the previous sessions. The processor can also further classify the current session as a replay attack in response to detecting that a replay likelihood score of the current session exceeds a threshold. In some examples, the processor can classify the current session as an authentic session in response to detecting that no replay likelihood score of the current session exceeds the threshold. Thus, embodiments of the present disclosure enable protection of online accounts and prevent replay attacks from being used to spoof biometric behavioral data.

With reference now to FIG. 1, a schematic diagram shows an example process for detecting replay attacks using action windows. The example process is generally referred to by the reference number 100. The process 100 may be implemented via method 300 using computing device 400 or the computer readable medium 700 of FIGS. 3, 4, and 7. For example, the process may be implemented via the processor 402 or the processor 702 of FIGS. 4 and 7.

FIG. 1 includes sessions 102A, 102B, 102C, and 102D. For example, session 102A may be a current session and sessions 102B, 102C, and 102D may be previous sessions. In various examples, sessions 102B, 102C, and 102D may be previously verified sessions of a user. FIG. 1 includes action windows 104. FIG. 1 further includes window similarity scores shown generated based on the action windows 104 of sessions 102A and 102B. FIG. 1 also includes aggregated window similarity scores 108A, 108B, and 108C associated with sessions 102B, 102C, and 102D. FIG. 1 also includes a replay attack detection 110.

In the example of FIG. 1, a user may be attempting to authenticate or verify identification with a service. For example, the use may be logging in using a username and a password. In various example, behavior biometric component of authentication may be used to authenticate or verify the user. For example, a basic assumption in BB is that the user has a pattern of behavior, and thus new sessions will be somewhat similar to previous ones. However, in the process 100, new sessions that are almost identical or identical to the previous sessions may be detected to be a result of replay attack rather than authentic activity of the user. A current session 102A and previous sessions 102B, 102C, and 102D are received. For example, the current session 102A may be associated with the current attempt to login using the username and password, and previous sessions 102B, 102C, and 102D may be associated with past successful logins using the same username and password. Each of the sessions 102A, 102B, 102C, and 102D may include temporally organized biometric behavioral data. For example, the temporally organized biometric behavioral data may include keystrokes, mouse movements, touch screen data, etc.

Still referring to FIG. 1, as indicated by arrows 112, the process 100 includes splitting each of the 102A, 102B, 102C, and 102D into a number of action windows 104. In various examples, a size of the action windows 104 may be determined based on the variance in the account. For example, the account may be associated with the username used to login to the account. In some examples, the variance in the account may be calculated by comparing between the previous sessions 102B, 102C, and 102D of the account using the process 100 with a default window size. The variance may be based on the resulting replay likelihood scores between the previous sessions 102B, 102C, and 102D. High replay likelihood scores between previous sessions 102B, 102C, and 102D may imply that the variance in the account is low, and vice versa. Large action windows 104 may result in lower replay likelihood scores than small action windows 104. For example, the longer the action window 104, the more likely the action windows 104 are to differ significantly from another similar but not identical action windows 104. Thus, the window size may be set as larger for accounts with lower variance and smaller for accounts with higher variance.

As indicated by arrows, the process 100 includes a pair-wise comparison 114 that is performed between the action windows 104 of the current session 102A and the action windows 104 of each of the previous sessions 102B, 102C, and 102D to generate window similarity scores 106 for each pair of action windows 104. In order to compare between windows, the process 100 can either use the raw sequence of information, or it can use a representation of each window using a vector of calculated features, as described in FIG. 2. In the example of FIG. 1, the window similarity scores 106 for the comparison between the action windows 104 of current session 102A and previous session 102B are shown. For example, a similarity score may be generated for each action window 104 of the current session that reflects the probability of that action window 104 to be a replayed window. A replayed window may be an action window 104 of the current session 102A that was generated from spoofing the actions of the user. Window similarity scores 106 for the comparison between the action windows 104 of current session 102A and previous sessions 102C and 102D may be similarly calculated.

As one example, each of the sessions 102A, 102B, 102C, and 102D may be composed of action windows 104 represented as vectors of numeric values. The process 100 can calculate the similarity score of each action window for the current session as compared to each action window of a previous session 102B, 102C, or 102D. To determine the score of an action window 104 of the current session 102A, the action window 104 is first compared to action windows 104 from the other the session 102B, 102C, or 102D. The current session's action window 104 is compared to all action windows 104 of the other session 102B, 102C, or 102D, or to a subset of those action windows 104 according to some heuristic. For example, the current session's action window 104 may only be compared to action windows 104 that are in the same URL as the application. In some examples, the comparison of action windows 104 is performed by calculating a similarity function such as a Cosine Similarity, a Pearson correlation, or a Euclidean distance. In various examples, the similarity scores may be generated using a machine learning model or deep learning model. For example, the similarity scores can be generated using a machine learning classifier, or a regression algorithm. The comparison of action windows 104 may yield a similarity score with respect to the action window 104 of the current session for each of the action windows 104 of the previous session 102B, 102C, or 102D. Then, in some examples, the process 100 can aggregate all the scores to a single window similarity score by some aggregation function. For example, the processor can aggregate the scores using a mean score, a median score, or a maximal score. The aggregated score is defined as the window similarity score 106 for the action window 104 of the current session 102A with respect to one of the previous sessions 102B, 102C, or 102D. The process 100 may similarly calculate window similarity scores 106 for each of the action windows 104 of the current session 102A. In the example of FIG. 1, the window similarity scores 106 are shown calculated with respect to previous session 102B. The process 100 may also similarly calculate window similarity scores 106 for each of the action windows 104 of the current session 102A with respect to the previous session 102C and the previous session 102D.

As indicated by arrows 116, the process 100 includes aggregating the window similarity scores 106 of the current session's 102A action windows 104 to generate replay likelihood scores 108A, 108B, and 108C of the current session 102 with respect to each of the previous sessions 102B, 102C, and 102D. The replay likelihood scores 108A, 108B, and 108C may represent the likelihood that the current session 102A was generated by a replay attack based on the previous sessions 102B, 102C, and 102D, respectively. For example, after calculating the window similarity score 106 for every action window of the current session, these scores are aggregated to a single replay likelihood score. In various examples, the aggregation of the window similarity scores 106 may be based on an aggregation function, such as a mean, a median, or any other aggregation function that takes a finite number of numeric values and yields a single numeric value between 0 and 1. For example, the aggregation of the window similarity scores 106 may be based on the mean score of action windows 104 in the second decile of window similarity scores. In some examples, the replay likelihood scores 108 may be normalized between 0 and 1. In FIG. 1, the replay likelihood scores 0.98 108A, 0.3 108B, and 0.1 108C are normalized.

As indicated by arrows 118, the process 100 includes determining whether the session is a replay attack 110 or authentic usage based on a precomputed threshold. Specifically, a replay attack based on previous session 102B may be detected. In some examples, a binary classification for the current session 102A may be based on the replay likelihood scores. In various examples, if there is at least one replay likelihood score 108A, 108B, or 108C that is above the threshold, then the current session 102A is classified as a replay attack 110. Otherwise, the current session 102A may be classified as an authentic session. As one example, given a threshold of 0.89, the replay likelihood score 108A of 0.9 may cause a replay attack 110 alarm. In some examples, the binary classification may be based on a threshold that is precomputed for the user. For example, the pre-defined threshold may be determined by comparing between previous sessions 102B, 102C, 102D that are associated with the account and calculating a threshold from the comparison results. An example of a possible threshold computation can be defined using the equation:

$$\text{Min}\left(\text{Mean}(S) + 2STD(S), \frac{1 + \text{Max}(S)}{2}\right) \quad \text{Eq. 1}$$

where S is the set of computed replay likelihood scores between the account sessions.

The schematic diagram of FIG. 1 is not intended to indicate that the operations of the process 100 are to be executed in any particular order, or that all of the operations of the process 100 are to be included in every case. Additionally, the process 100 can include any suitable number of additional operations or components. For example, process 100 may include additional sessions, action windows, scores, etc.

Figure 2:
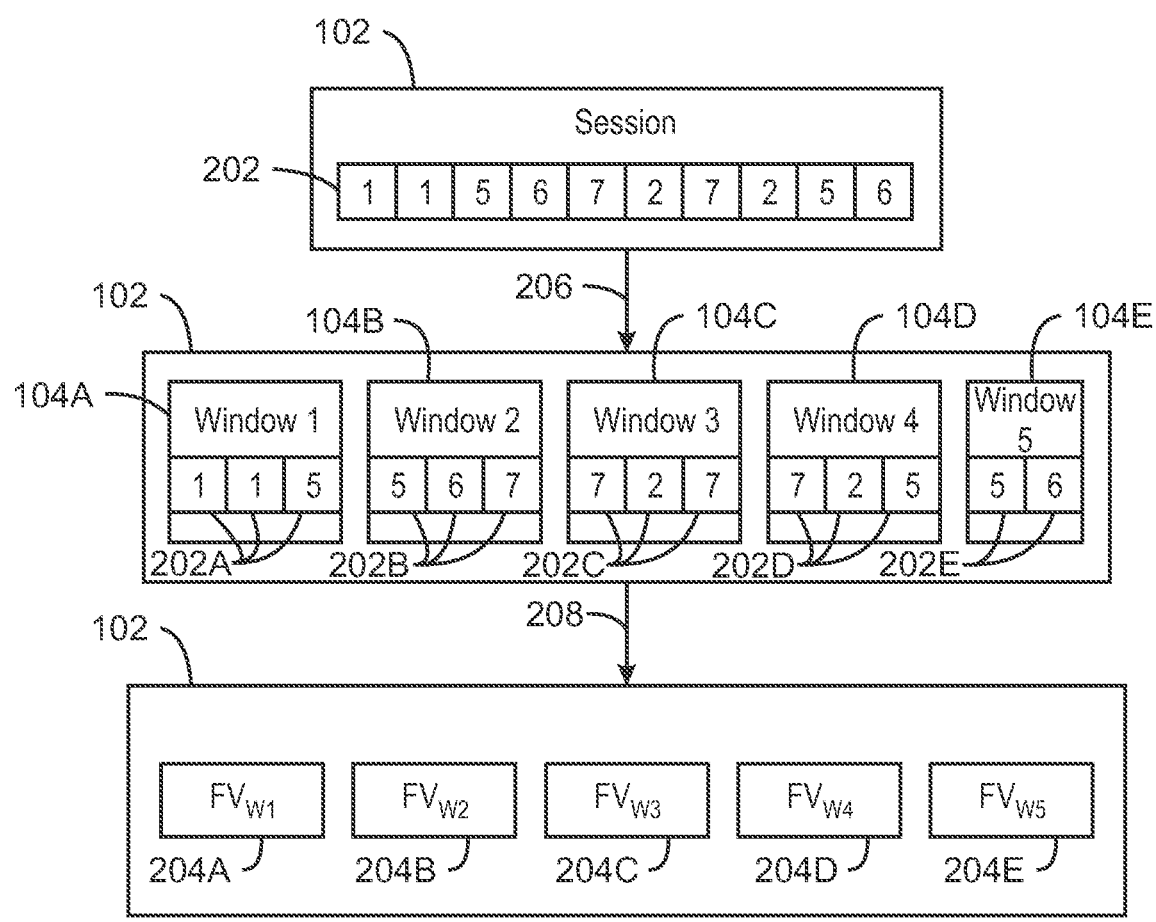
FIG. 2 is a schematic diagram of an example process for generating a set of action windows and feature representations.

FIG. 2 is a schematic diagram shows an example process for generating a set of action windows and feature representations of the action windows. The process 100 may be implemented in method 300 using computing device 400 or the computer readable medium 700 of FIGS. 3, 4, and 7. For example, the process may be implemented via the processor 402 or the processor 702 of FIGS. 4 and 7.

FIG. 2 includes similarly numbered elements from FIG. 1. For example, FIG. 2 includes a session 102. The session 102 includes a number of session events 202. FIG. 2 includes action windows 104A, 104B, 104C, 104D, and 104E associated with subsets 202A, 202B, 202C, 202D, 202E of session events 202. FIG. 2 also includes a set of feature representations 204A, 204B, 204C, 204D, and 204E associated with action windows 104A, 104B, 104C, 104D, and 104E.

In the example of FIG. 2, a session 102 with a number of session events 202 is received. For example, the session 102 may be a temporal session, such as a current session or a previous session as described in FIG. 1. In various examples, the session events 202 are representations of biometrical behavior data, such as mouse clicks or movements, keystrokes, etc.

Still referring to FIG. 2, as indicated by an arrow 206, the session 102 is split into action windows 104. In various examples, action windows 104 are a subset of following events and each represent a small portion of the session. In some examples, the window size of the action windows 104 may be not constant. For example, the window size of the action windows 104 may depend on variance in the account. In some examples, the action windows 104 can be divided by a fixed size, or according to a certain time frame, or a context frame and can either be distinctive or overlapping. For example, an example context frame may be a web page uniform resource locator (URL) address. In addition, action windows 104 can include idle time between events and the context of the action windows 104. For example, the context of the action windows 104 may include a page, URL, events, presses, scrolls, etc.

As one example, a keystroke session 102 may include the name "Andrey" being typed. In some examples, the data of the keystroke session 102 may be in the form (key, action, t), where key is the name of the key (e.g. "enter", "l-ctrl", "l"), action is one of the following "P" (press) or "R" (release) and t is the relative timestamp of the event during the session. For example, the key stroke session 102 for the name "Andrey" being typed may be received as: (l-shift, P, 0.1), (a, P, 0.12), (a, R, 0.14), (l-shift, R, 0.15), (n, P, 0.27), (n, R, 0.41), (d, P, 0.43), (d, R, 0.46), (r, P, 0.59), (r, R, 0.6), (e, P, 0.75), (e, R, 0.77), (y, P, 0.91), (y, R, 0.94). For a window of size 4 with no overlap the action windows may include four action windows 104. For example, the four action windows 104 may include Action Window 1: (shift, P, 0.1), (a, P, 0.12), (a, R, 0.14), (shift, R, 0.15), Action Window 2: (n, P, 0.27), (n, R, 0.41), (d, P, 0.43), (d, R, 0.46), Action Window 3: (r, P, 0.59), (r, R, 0.6), (e, P, 0.75), (e, R, 0.77), and Action Window 4: (y, P, 0.91), (y, R, 0.94).

In various examples, the size of an action window 104 may be defined based on the variance in the account. For example, the variance in the account in the account may be calculated based on previous sessions associated with the account. In some examples, the calculation may be based on replay likelihood scores that are computed for pairs of these sessions with a default window size. For example, the mean of the replay likelihood scores may determine the amplitude of the deviation. A high mean score may indicate that the account variance is low because the sessions of the account are very similar. In various examples, other metrics can be used as well. For example, the metric may include median, max, and min metrics. In various examples, the window size may be a function of the amplitude. For example, the window size may be determined using the equation:

$$\text{winSize} = \text{Max}(\text{MinSize}, (1-M)*\text{MaxSize}) \quad \text{Eq. 2}$$

where M is the mean size of the computed likelihood scores, MinSize is a pre-defined minimal window size, and MaxSize is a pre-defined maximal window size.

In various examples, as indicated by an arrow 280 in FIG. 2, in order to compare between action windows 104 of the current session 102 and previous sessions, a set of representations 204A, 204B, 204C, 204D, and 204E corresponding to the action windows 104A, 104B, 104C, 104D, and 104E may be generated including a vector of calculated features. In some examples, the representations 204A, 204B, 204C, 204D, and 204E may depend on the type and the form of the data in each of the action windows 104A, 104B, 104C, 104D, and 104E.

As one example, the session events 202 may include mouse movement event data of the form (et, x, y, t), where et is the event type, x and y are the coordinates of the mouse on the display device, and t is the relative timestamp of the event during the session. For example, the event type may include: M—move, S—scroll, LD—left down, LU—left up, RD—right down, RU—right up, among other event types. In some examples, for an action window containing n events, or of the size n, may be represented by the form: $[(et_1, x_1, y_1, t_1), \ldots, (et_n, x_n, y_n, t_n)]$. In various examples, a possible representation of the window can include a superset or a subset of any the following values: a total movement Euclidean distance in pixels, a window angle between starting point and final point, a mean x coordinate location, a standard deviation of x coordinate location, a mean y coordinate location, a standard deviation of y coordinate location, a mean time delta between events in milliseconds, a standard deviation (STD) of time delta between events, a percentage of events of each type that includes a value for each event type, an average time delta between event types that includes a value for each possible pair of events, and a standard deviation (STD) of time delta between event types that includes a value for each possible pair of events.

As one example, the session events 202 may include touch screen data. For example, the touch screen data type may be very similar to the mouse movements in terms of the form of the data. The event types of the session events 202 for touch screen data may include: TP—touch press, TR—touch release, TM—touch move. In some examples, touch screen data may include additional features, such as pressure, size of surface press, and other sensors. Therefore, in various examples, the representation may be very similar to the representation of the mouse movement action windows, together with representation of the additional features such as mean pressure within window, mean press surface size, etc.

As another example, the session events 202 may include keyboard strokes. For data of the form (key,action,t) as described in the example of the action windows, the representation of keyboard strokes window can be a vector of the following numeric values: window duration time, mean time between press actions, mean time between press and release actions, mean time between specific keys or group of keys. For example, mean time between a numeric to alphabet keys or the mean time between the 'l-ctrl' and the 'c' keys, STD of all the times mentioned above.

The schematic diagram of FIG. 2 is not intended to indicate that the operations of the process 200 are to be executed in any particular order, or that all of the operations of the process 200 are to be included in every case. Additionally, the process 200 can include any suitable number of additional operations or components. For example, process 200 may include additional sessions, action windows, scores, etc. In some examples, although possible representation of mouse movements, touch screen and key strokes data types are described herein, the process 100 can work on other types of input devices and forms of data, and may also use raw data as well.

Figure 3:
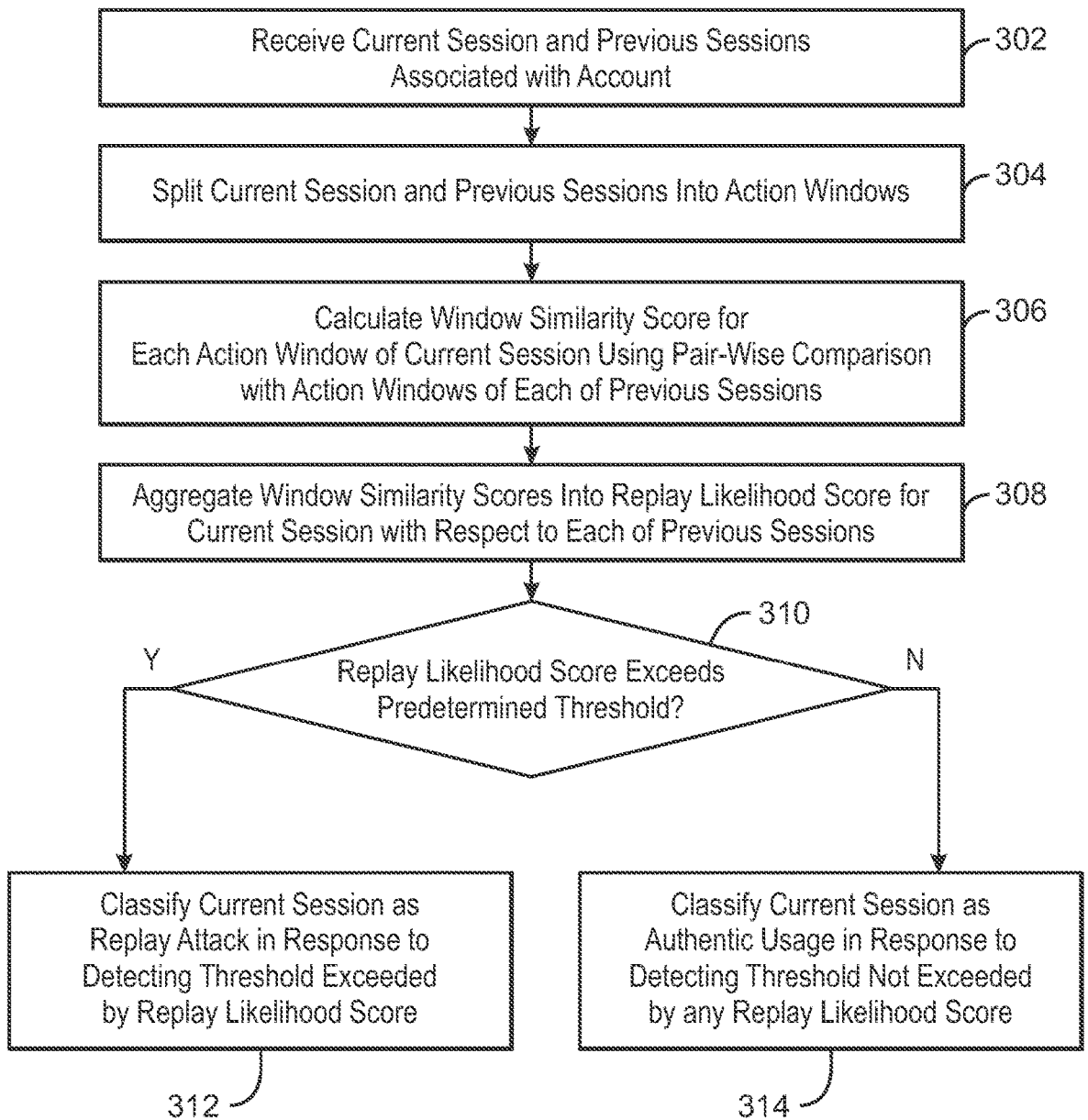
FIG. 3 is a block diagram of an example method that can detect replay attacks using action windows.

FIG. 3 is a process flow diagram of an example method that can detect replay attacks using action windows. The method 300 can be implemented with any suitable computing device, such as the computing device 300 of FIG. 3 and is described with reference to the processes 100 and 200 of FIGS. 1 and 2. In various examples, the methods described below can be implemented by the computing device 400 or the computer-readable medium 700 of FIGS. 4 and 7. For example, the method 300 can be implemented via the processor 402 or the processor 702.

At block 302, a current session and previous sessions associated with an account are received. For example, the current session and previous sessions may each include temporally organized behavior biometric data. In some examples, the current session may also include a username and password. For example, the username and password may be typed according to the temporally organized behavior biometric data.

At block 304, the current session and previous sessions are split into action windows. In some examples, a size of the action windows may also be calculated based on a variance of the account. For example, the variance of the account can be calculated based on a similarity between the previous sessions associated with the account.

At block 306, a window similarity score is calculated for each action window of the current session using a pair-wise comparison with action windows of each of the previous sessions. For example, the similarity scores for an action window of the current session with respect to a subset of action windows of a first previous session may be calculated and aggregated to generate the window similarity score for the action window with respect to the first previous session. In various examples, the similarity scores are calculated using machine learning. In some examples, the similarity scores are calculated using a similarity function, such as a Cosine Similarity, a Pearson correlation, or a Euclidean distance. In various examples, the similarity scores are aggregated using a mean score, a median score, or a maximal score.

At block 308, the window similarity scores are aggregated to generate a replay likelihood score for the current session with respect to each of the previous sessions. For example, the window similarity scores may be aggregated based on an aggregation function that yields a single numeric value between 0 and 1.

At decision diamond 310, a determination is made as to whether a replay likelihood score exceeds a predetermined threshold. If any replay likelihood score exceeds the predetermined threshold, the method may proceed at block 312. If none of the replay likelihood scores exceeds the predetermined threshold, then the method may proceed at block 314. In various examples, the threshold may be precomputed by comparing between previous sessions 102B, 102C, 102D that are associated with the account and calculating a threshold from the comparison result.

At block 312, the current session is classified as a replay attack in response to detecting that a replay likelihood score of the current session exceeds the threshold. In some examples, a user submitting the current session may be denied authentication or verification.

At block 314, the current session is classified as an authentic usage in response to detecting that a replay likelihood score of the current session does not exceed the threshold. In some examples, the user submitting the current session may then be authenticated or verified. For example, the user may be authenticated based on the username and password provided in the current session.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

In some scenarios, the techniques described herein may be implemented in a cloud computing environment. As discussed in more detail below in reference to at least FIGS. 4-7, a computing device configured to detect replay attacks using action windows may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
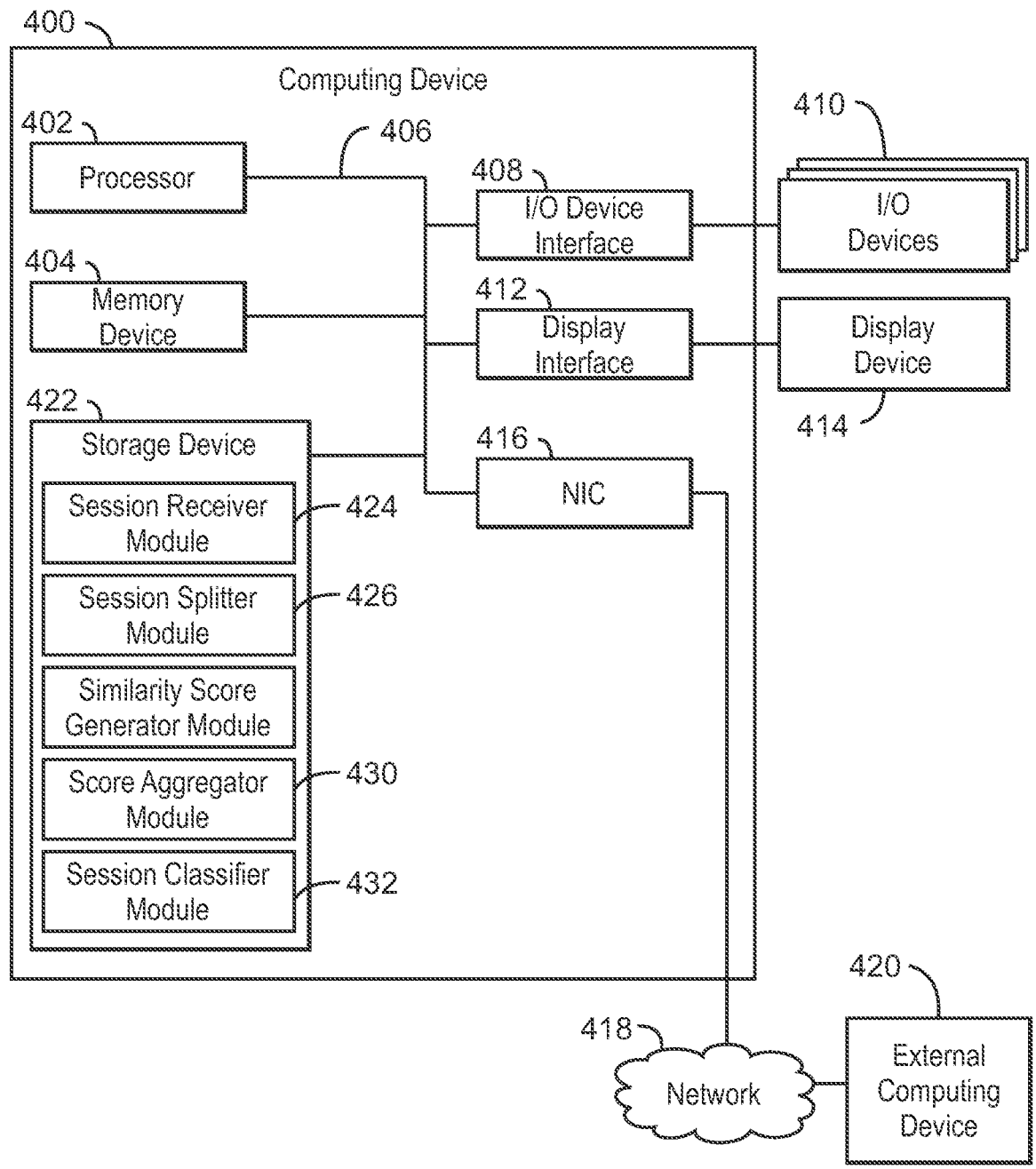
FIG. 4 is a block diagram of an example computing device that can detect replay attacks using action windows.

FIG. 4 is block diagram of an example computing device that can detect replay attacks using action windows. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external web-server 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a session receiver module 424, a session splitter module 426, a similarity score generator module 428, a score aggregator module 430, and a session classifier module 432. The module session receiver 424 can receive a current session and previous sessions associated with an account. For example, the current session and previous session each include temporally organized behavior biometric data. The session splitter module 426 can split the current session and the previous sessions into action windows. In some examples, the session splitter module 426 can calculate a size of the action windows based on a variance of the account. For example, the session splitter module 426 can calculate the variance of the account based on a similarity between the previous sessions associated with the account. The similarity score generator module 428 can calculate a window similarity score for each action window of the current session using a pair-wise comparison with action windows of each of the previous sessions. For example, the similarity score generator module 428 can calculate similarity scores for an action window of the current session with respect to a subset of action windows of a first previous session and aggregate the similarity scores to generate the window similarity score for the action window with respect to the first previous session. In some examples, the similarity score generator module 428 can aggregate the similarity scores for each action window using a mean score, a median score, or a maximal score. The score aggregator module 430 can aggregate the window similarity scores to generate a replay likelihood score for the current session with respect to each of the previous sessions. The session classifier module 432 can classify the current session as a replay attack in response to detecting that a replay likelihood score of the current session exceeds a threshold. In some examples, the session classifier module 432 can classify the current session as an authentic usage in response to detecting that the threshold is not exceeded by the replay likelihood score of the current session with respect to the previous sessions.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the session receiver module 424, the session splitter module 426, the similarity score generator module 428, the score aggregator module 430, and the session classifier module 432, may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of session receiver module 424, the session splitter module 426, the similarity score generator module 428, the score aggregator module 430, and the session classifier module 432, can be implemented with logic, wherein the logic, as referred to herein, can include any suitable hardware (e.g., a processor, among others), software (e.g., an application, among others), firmware, or any suitable combination of hardware, software, and firmware.

Figure 5:
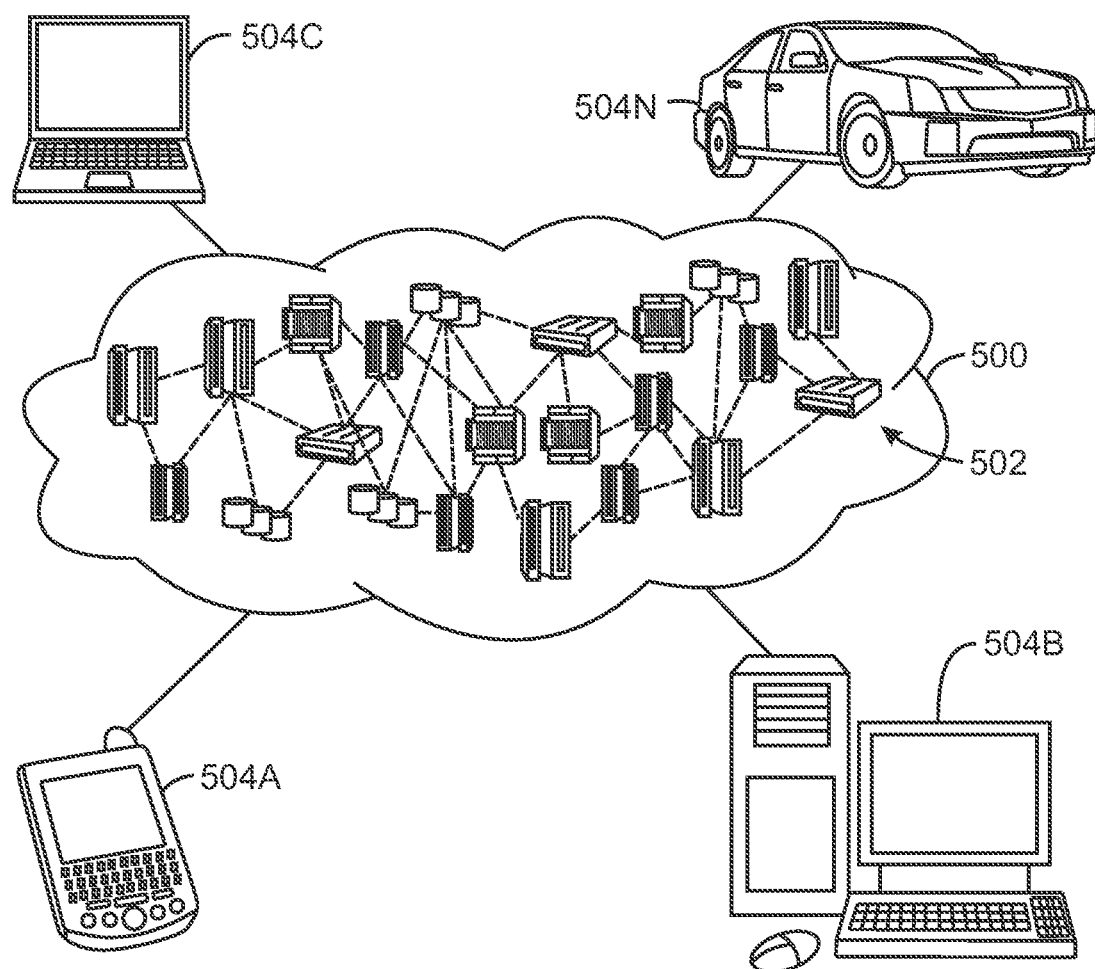
FIG. 5 is a diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
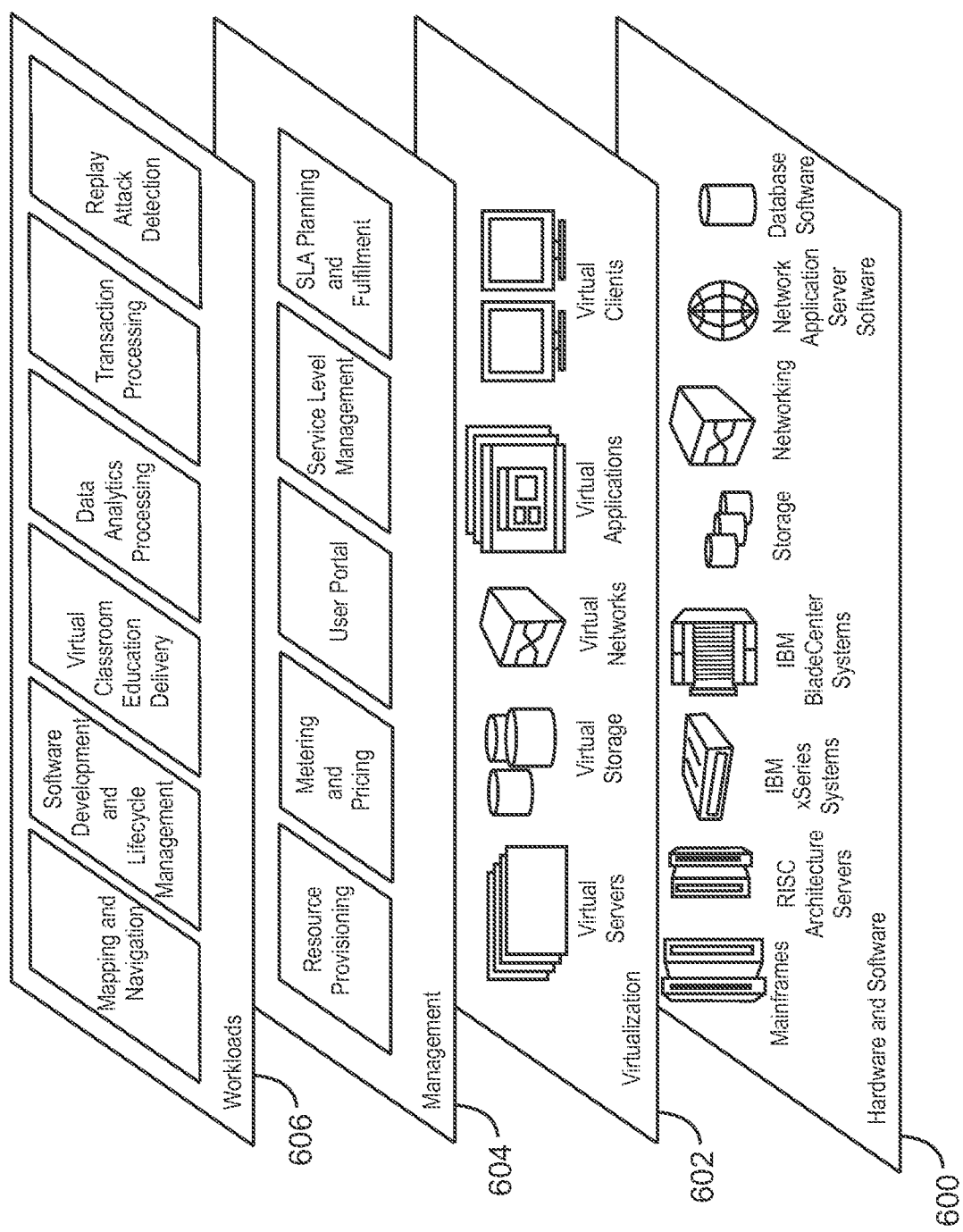
FIG. 6 is a diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and replay attack detection.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
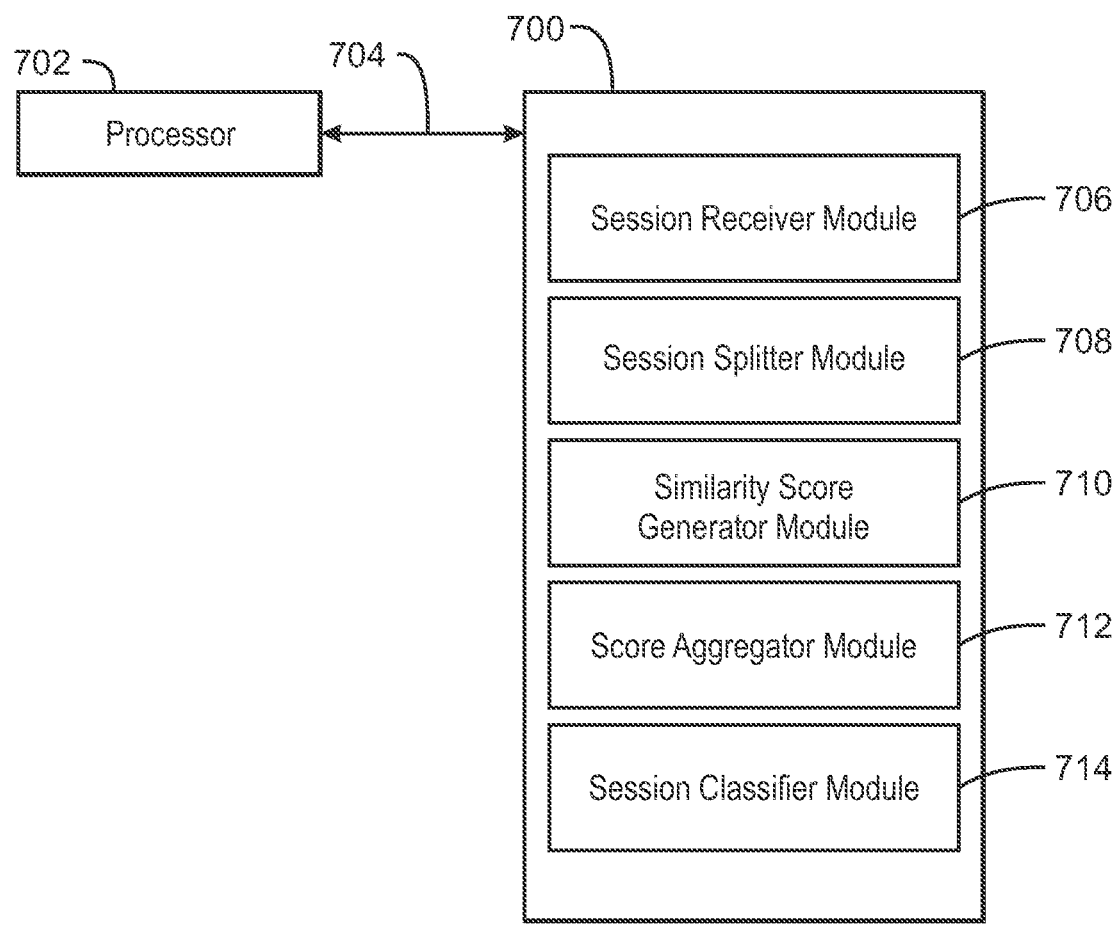
FIG. 7 is an example tangible, non-transitory computer-readable medium that can detect replay attacks using action windows.

Referring now to FIG. 7, a block diagram is depicted of an example tangible, non-transitory computer-readable medium 700 that can detect replay attacks using action windows. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3.

The various software components discussed herein may be stored on the tangible, non-transitory, computer-readable medium 700, as indicated in FIG. 7. For example, a session receiver 706 includes code to receive a current session and previous sessions associated with an account. A session splitter module 708 includes code to split the current session and the previous sessions into action windows. The session splitter module 708 further includes code to calculate a size of the action windows based on a variance of the account. A similarity score generator module 710 includes code to calculate a window similarity score for each action window of the current session using a pair-wise comparison with action windows of each of the previous sessions. The similarity score generator module 710 also includes code to calculate similarity scores for an action window of the current session with respect to a subset of action windows of a first previous session and aggregate the similarity scores to generate the window similarity score for the action window with respect to the first previous session. In some examples, the similarity score generator module 710 also includes code to calculate the similarity scores using a similarity function including a Cosine Similarity, a Pearson correlation, or a Euclidean distance. In various examples, the similarity score generator module 710 includes code to aggregate the similarity scores using a mean score, a median score, or a maximal score. A score aggregator module 712 includes code to aggregate the window similarity scores to generate a replay likelihood score for the current session with respect to each of the previous sessions. A session classifier module 714 includes code to classify the current session as a replay attack in response to detecting that a replay likelihood score of the current session exceeds a threshold. In some examples, the session classifier module 714 also includes code to classify the current session as an authentic usage in response to detecting that a replay likelihood score of the current session does not exceed the threshold. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a hardware processor to:
    receive a current session and previous sessions associated with an account;
    split the current session and the previous sessions into action windows, wherein the hardware processor is to calculate a size of the action windows based on a variance of the account;
    calculate a window similarity score for each action window of the current session using a pair-wise comparison with action windows of each of the previous sessions;
    aggregate the window similarity scores to generate a replay likelihood score for the current session with respect to each of the previous sessions; and
    classify the current session as a replay attack in response to detecting that a replay likelihood score of the current session exceeds a threshold.

2. The system of claim 1, wherein the hardware processor is to calculate the variance of the account based on a similarity between the previous sessions associated with the account.

3. The system of claim 1, wherein the hardware processor is to calculate similarity scores for an action window of the current session with respect to a subset of action windows of a first previous session and aggregate the similarity scores to generate the window similarity score for the action window with respect to the first previous session.

4. The system of claim 3, wherein the hardware processor is to aggregate the similarity scores for each action window using a mean score, a median score, or a maximal score.

5. The system of claim 1, wherein the current session and previous session each comprise temporally organized behavior biometric data.

6. The system of claim 1, wherein the hardware processor is to classify the current session as an authentic usage in response to detecting that the threshold is not exceeded by the replay likelihood score of the current session with respect to the previous sessions.

7. A computer-implemented method, comprising:
receiving, via a processor, a current session and previous sessions associated with an account;
splitting, via the processor, the current session and the previous sessions into action windows, wherein splitting the current session and the previous sessions into action windows comprises calculating a size of the action windows based on a variance of the account;
calculating, via the processor, a window similarity score for each action window of the current session using a pair-wise comparison with action windows of each of the previous sessions;
aggregating, via the processor, the window similarity scores to generate a replay likelihood score for the current session with respect to each of the previous sessions; and
classifying, via the processor, the current session as a replay attack in response to detecting that a replay likelihood score of the current session exceeds a threshold.

8. The computer-implemented method of claim 7, wherein calculating the window similarity score comprises calculating similarity scores for an action window of the current session with respect to a subset of action windows of a first previous session, and aggregating the similarity scores to generate the window similarity score for the action window with respect to the first previous session.

9. The computer-implemented method of claim 8, wherein the similarity scores are calculated using machine learning or a similarity function, wherein the similarity function comprises a Cosine Similarity, a Pearson correlation, or a Euclidean distance.

10. The computer-implemented method of claim 8, wherein similarity scores are aggregated using a mean score, a median score, or a maximal score.

11. The computer-implemented method of claim 7, wherein aggregating the window similarity scores is based on an aggregation function that yields a single numeric value between 0 and 1.

12. The computer-implemented method of claim 7, further comprising classifying the current session as an authentic usage in response to detecting that a replay likelihood score of the current session does not exceed the threshold.

13. A computer program product for detecting replay attacks, the computer program product comprising a computer-readable storage medium having program code embodied therewith, wherein the computer readable storage medium is not a transitory signal per se, the program code executable by a processor to cause the processor to:
receive a current session and previous sessions associated with an account;
split the current session and the previous sessions into action windows, wherein the processor is to calculate a size of the action windows based on a variance of the account;
calculate a window similarity score for each action window of the current session using a pair-wise comparison with action windows of each of the previous sessions;
aggregate the window similarity scores to generate a replay likelihood score for the current session with respect to each of the previous sessions; and
classify the current session as a replay attack in response to detecting that a replay likelihood score of the current session exceeds a threshold.

14. The computer program product of claim 13, further comprising program code executable by the processor to calculate similarity scores for an action window of the current session with respect to a subset of action windows of a first previous session and aggregate the similarity scores to generate the window similarity score for the action window with respect to the first previous session.

15. The computer program product of claim 14, further comprising program code executable by the processor to calculate the similarity scores using a similarity function comprising a Cosine Similarity, a Pearson correlation, or a Euclidean distance.

16. The computer program product of claim 14, further comprising program code executable by the processor to aggregate the similarity scores using a mean score, a median score, or a maximal score.

17. The computer program product of claim 13, further comprising program code executable by the processor to classify the current session as an authentic usage in response to detecting that a replay likelihood score of the current session does not exceed the threshold.

\* \* \* \* \*